United States Patent [19]
Pera et al.

[11] Patent Number: 4,491,383
[45] Date of Patent: Jan. 1, 1985

[54] DEVICE FOR MODIFYING AND UNIFORMING THE DISTRIBUTION OF THE INTENSITY OF A POWER LASER BEAM

[75] Inventors: Luciano Pera, Vinovo; Armando Boggero, Turin; Giorgio Manassero, Turin; Paolo Gay, Turin, all of Italy

[73] Assignee: Centro Ricerche Fiat S.p.A., Turin, Italy

[21] Appl. No.: 420,359

[22] Filed: Sep. 20, 1982

[51] Int. Cl.³ .......................................... G02B 27/17
[52] U.S. Cl. ....................................... 350/66; 350/484
[58] Field of Search ................. 350/6.5, 6.6, 539, 301, 350/289, 6.9

[56] References Cited
U.S. PATENT DOCUMENTS 4,258,246  3/1981  Karube et al. ..................... 350/486
4,264,119  4/1981  Minoura et al. ..................... 350/6.6
4,367,017  1/1983  Jimbou et al. ..................... 350/486
4,370,026  1/1983  Dubroeucq et al. ............... 350/163

FOREIGN PATENT DOCUMENTS 179818  11/1982  Japan ................................. 350/6.6

Primary Examiner—John K. Corbin
Assistant Examiner—Lynn Vandenburgh Kent
Attorney, Agent, or Firm—Albert L. Jeffers

[57] ABSTRACT

A device for modifying and uniforming the distribution of the intensity of a power laser beam is provided wherein a rotatable support body includes three mirrors for reflecting an incident laser beam. The rotation of the mirrors with the support body effects a uniform distribution of the intensity of the incident laser beam resulting in a reflected laser beam having uniform distribution of intensity across its cross section. A modification section is included for modifying the amplitude of the reflected laser beam passing from the support body.

13 Claims, 3 Drawing Figures

DEVICE FOR MODIFYING AND UNIFORMING THE DISTRIBUTION OF THE INTENSITY OF A POWER LASER BEAM

BACKGROUND OF THE INVENTION

The present invention relates to a device for modifying and uniforming the distribution of intensity of a power laser beam.

It is known that the non uniform power distribution of the intensity of a laser beam represents a serious drawback for the possible industrial applications on the field of the thermal treatments. In fact, considering, for example, a process of hardening of steels or cast iron, it is noticed that an essential requirement consist in reaching a surface temperature value of the metal very near to the value of the melting temperature; in particular, the regions subjected to a laser treatment are required to have a uniform distribution of the temperature, because even small localized variations can determine an undesired hardness value or even an undesired fusion of the material. As these temperature variations are due to lack of uniformity in the spatial distribution of the intensity of the laser beam which acts onto the material, it is extremely important to have at one's disposal a laser beam of uniform intensity. Since it is not possible to act onto the source which emits the power laser beam, various devices have been provided which aim to render uniform the distribution of the intensity of the laser beam before said beam falls onto the material which has to be submitted to the treatment.

A first device, which is somewhat simple in its structure, comprises substantailly a converging lens, and the piece to be treated is positioned out of focus or in the focus of the lens; in this latter case, the lens utilized is of the type with a long focus. The device of this type allows an economical manipulation of the laser beam, however the obtained distribution of the intensity is still dependent on the shape and stability of the laser beam coming out from the emission source and therefore is highly critical as regards its practical utilization.

A second device, quite largely used, comprises substantially two oscillating mirrors which are mounted along the route of the laser beam and generally are distributed within the optical focusing device. In particular, these mirrors are made to oscillate in directions orthogonal to each other and allow obtaining an output beam whose cross-section size is adjustable. These devices allow obtaining also an improvement of the uniformity of the intensity profile of the outgoing laser beam in respect of the beam generated by the source, however this profile still has two undesirable peaks at its ends.

A third known device substantially comprises a curved integrator mirror which substantially divides the wave front of the incident laser beam into a plurality of secondary reflected beams and is dimensioned so as to direct all these secondary beams onto a single surface region of the piece to be treated. Said integrator mirror is formed substantially by providing a plurality of facetings on a copper mirror, for example by means of a diamond tool, or by fastening on a copper substratum a plurality of small plane square reflecting pieces, for example, of molybdenum. The mirror obtained by means of a diamond tool is substantially less expensive, but the intensity profile of the laser beam which is obtained from this mirror still has marked peaks uniformly distributed, because of the phenomena of interference and diffraction due to the typical surface configuration of the mirror itself. The mirror formed by means of small reflectant square pieces of molybdenum, in addition to being very expensive, has disadvantages which show themselves every time it is necessary to clean the square pieces because of the dust which easily penetrates into the slits between the small square pieces; moreover, it is particularly difficult to provide an efficient cooling system for this mirror.

SUMMARY OF THE INVENTION

The object of the present invention is to provide a device capable of modifying and, in particular, uniforming the distribution of the intensity in a power laser beam, without having the drawbacks of the known devices mentioned hereinabove.

This object is attained by the present invention which provides a device for modifying and uniforming the distribution of the intensity of a first power laser beam, characterized in comprising a manipulation section provided with a plurality of rotating mirrors which reflect said first beam and generate at the outlet of said section a reflected beam which has substantially the same spatial distribution of the intensity as the first beam, but rotates about its own axis of symmetry in the direction of propagation.

BRIEF DESCRIPTION OF THE DRAWINGS

For a better understanding of the present invention a preferred embodiment thereof will now be described, by way of non limiting example, with reference to the accompanyinhg drawing, in which.

DETAILED DESCRIPTION OF THE INVENTION

Figure 1:
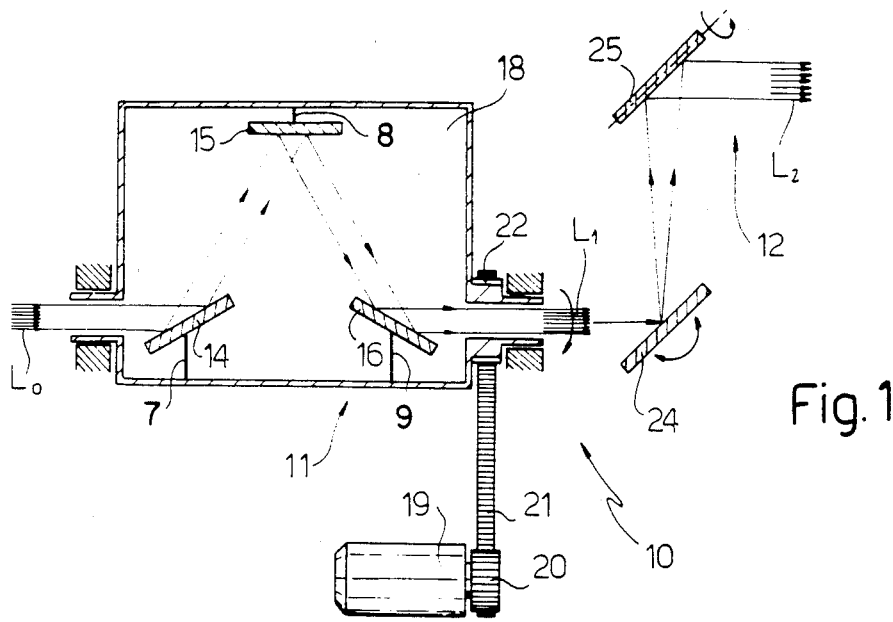
FIG. 1 is a diagrammatic view of a device according to the teachings of the present invention.

Referring now particularly to FIG. 1, reference numeral 10 indicates generally a device according to the teachings of the present invention, arranged to manipulate, in the manner which will be described later, an incident laser beam indicated by $L_0$ and generated by a laser source not shown. In particular, device 10 comprises a section 11 apt to uniform the distribution of the intensity of the beam $L_0$ and at the outlet of which a reflected laser beam $L_1$ is obtained, and a section 12 whose purpose is to modify the amplitude of the cross-section of the beam $L_1$ so as to originate a second reflected laser beam indicated by $L_2$. Conveniently, section 11 is preferably arranged within an optical system (not shown) provided for the focusing of the beam $L_0$.

More specifically, section 11 comprises substantially, in accordance with the teachings of the present invention, three mirrors 14, 15, 16. Conveniently, the angle formed by the reflecting surfaces of the mirrors 14 and 16 is of 120°; in this way, the laser beam $L_0$ is reflected by the inlet mirror 14 towards the intermediate mirror 15 and by this latter towards the outlet mirror 16 from which it is then reflected as beam $L_1$ which propagates in the same direction of the incident beam $L_0$. Preferably, each mirror 14, 15, 16 is made of copper and is cooled by means of a water cooling system not shown. The mirrors 14, 15, 16 are connected by support members 7, 8, and 9, respectively to a support body 18, conveniently cylindrical in shape, which is made to rotate with a predetermined angular speed, for example 3000 revolutions per minute, and about an axis defined by an ideal line connecting the beams $L_0$ and $L_1$. In particular, the support body 18 is made to rotate by means of a motor 19, a pinion 20 of which engages, through a gear 21, a gear 22 which is angularly coupled with the body 18.

Section 12 of the device 10 comprises a pair of mirrors 24, 25, each of which is made to vibrate, through means not shown, in planes perpendicular to each other and in an adjustable manner. In this way it is possible to obtain reflected beam $L_2$ having a cross-section whose dimensions are adjustable by adjusting the vibration amplitude of the mirrors.

Figure 2:
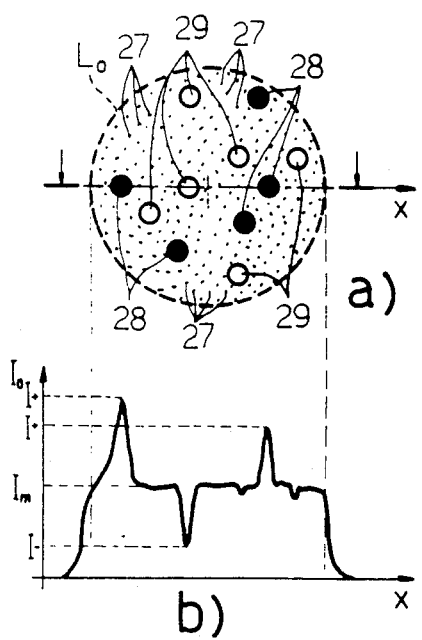
FIG. 2 is a sectional view showing a typical distribution of a laser beam at the inlet of the device of FIG. 1.

With particular reference to FIG. 2, in subfigure 2a there is shown, by way of example, a cross-section of the beam $L_0$. In this cross-section, reference numeral 27 indicates a plurality of rays, to each of which an average luminous intensity value $I_m$ is given, and reference numerals 28 and 29 indicate, respectively, groups of laser beams whose intensities $I_+$ and $I_-$ are higher or lower than said value $I_m$, respectively. With reference to FIG. 2b, there is shown the behaviour of the intensity ($I_0$) of the laser beam $L_0$ so as it is observed with respect to a predetermined section plane shown in FIG. 2a and whose trace is given by a line indicated by the letter x.

Figure 3:
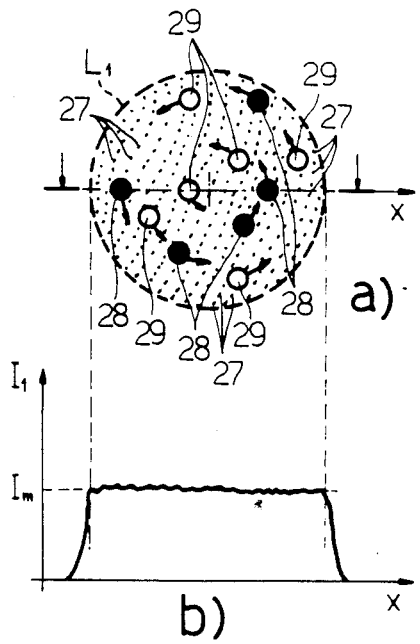
FIG. 3 is a diagrammatic representation of the typical distribution of a laser beam at the outlet from the device of FIG. 1.

Analogously to what has been described with reference to FIG. 2, in FIG. 3a there is shown a cross-section of the beam $L_1$ and in FIG. 3b there is shown the average behaviour of the intensity ($I_1$) of the laser beam $L_1$ during a rotation of one revolution of the support body 18 of the mirrors 14, 15 and 16.

The operation of the device 10 will now be described by considering separately the behaviour of the sections 11 and 12.

With reference to section 11, the rotation of the body 18 about the said axis and at a predetermined angular speed value determines in the beam $L_0$, through the combined reflections of the mirrors 14, 15, 16, a rotation at a double angular speed about its own axis of propagation. In this way, and with particular reference to FIG. 3a, both the rays 27 and the groups 28 and 29 of laser beams are now made to rotate about the axis of the beam, thus originating in output the cited beam $L_1$. Therefore, since within the limits of one revolution it may be presumed with a good approximation that the various contributions $I_{30}$ and $I_-$, respectively higher and lower with respect to the value $I_m$, in the intensity of the laser beam, substantially compensate each other, the average intensity distribution of the beam $L_1$ is uniform.

Section 12 serves, instead, to control the amplitude of the beam. To this end it will be sufficient to adjust the amplitude of vibration in the mirrors 24 and 25 in order to obtain the desired shape of the cross-section of the beam $L_2$.

From the analysis of the characteristics of the present invention it can be noticed that the device 10 permits to overcome the disadvantages of known devices mentioned hereinabove.

In fact, this device is rather simple in its structure, does not require complicated maintenance operations and renders uniform the distribution of the laser beam in the more suitable way for using the device in thermal treatments of the type specified hereinabove.

Finally, it is clear that modifications and variations can be made to the device 10, without departing from the scope of the present invention.

For example, the intermediate mirror 15 could be made annular in shape, in which case it would be sufficient that the body 18 makes to rotate only the mirrors 14 and 16. In this way, in addition to having a minor rotating mass as minor moment of inertia and consequent reduction of the mechanical strains transmitted to the respective supports, it would be possible to obtain a simplification of the cooling system of the new mirror 15.

We claim:

1. A device for modifying and uniforming the distribution of the intensity of a power laser beam, comprising:
   a uniforming section including a rotatable support body having disposed therein to rotate therewith a plurality of mirrors adapted for reflecting an incident laser beam portion as a reflected laser beam portion having a substantially uniform spatial distribution of intensity and rotating about its own axis of symmetry in the direction of propagation, said mirrors being oriented relative to the incident laser beam portion and the reflected laser beam portion such that the axial direction of propagation of both laser beam portions substantially coincide with each other.

2. The device of claim 1 wherein three of said mirrors are provided, one said mirror being an inlet mirror adapted for receiving the incident laser beam portion, a second said mirror being an outlet mirror adapted for reflecting the reflected laser beam portion from said uniforming section, and a third said mirror being an intermediate mirror adapted for reflecting to said outlet mirror the laser beam portion reflected by said inlet mirror.

3. The device of claim 2 wherein the reflecting surfaces of said inlet mirror and said outlet mirror are disposed about 120° relative to each other.

4. The device of claim 2 wherein said support body is rotatable about an axis substantially coincident with the axis of symmetry of both the laser beam portions.

5. The device of claim 4 wherein said intermediate mirror is rigidly mounted in said support body.

6. The device of claim 4 further comprising a motor operatively connected to said support body for rotating said support body about said common axis at an angular speed of predetermined value.

7. The device of claim 1 wherein said uniforming section is disposed within an optical focusing system adapted for focusing the directed laser beam portion.

8. The device of claim 1 further comprising a modification section adapted for modifying the dimensions of the cross section of the incident and reflected laser beam portions, said modification section including at least two mirrors being vibrateable in directions generally perpendicular to each other and disposed along the direction of propagation of both laser beam portions.

9. A device for modifying and uniforming the distribution of the intensity of a power laser beam, comprising:
   a support body rotatable about an eccentric axis of rotation, and
   a plurality of mirrors disposed in said support body to rotate therewith about said eccentric axis, said mirrors being adapted to reflect an incident laser beam portion directed along said eccentric axis to thereby direct a reflected laser beam portion along said eccentric axis having a substantially uniform distribution of power intensity and rotating about its own axis of symmetry in the direction of propagation.

10. The device of claim 9 wherein three of said mirrors are provided, one said mirror being an inlet mirror adapted for receiving the incident laser beam portion, a second said mirror being an outlet mirror adapted for reflecting the reflected laser beam portion from said support body, and a third said mirror being an intermediate mirror adapted for reflecting to said outlet mirror the laser beam portion, reflected by said inlet mirror.

11. The device of claim 10 wherein the reflecting surfaces of said inlet mirror and said outlet mirror are disposed about 120° relative to each other.

12. The device of claim 11 wherein said support body is disposed within an optical focusing system adapted for focusing the directed laser beam portion.

13. The device of claim 9 further comprising a modification section adapted for modifying the dimensions of the cross section of the incident and reflected laser beam portions, said modification section including at least two mirrors being virbrateable in directions generally perpendicular to each other and disposed along the direction of propagation of both laser beam portions.

* * * * *